United States Patent
Odachi et al.

(10) Patent No.: US 6,670,784 B2
(45) Date of Patent: Dec. 30, 2003

(54) MOTOR APPARATUS AND CONTROL METHOD THEREFOR

(75) Inventors: Yasuharu Odachi, Aichi-ken (JP); Tatsuo Ogawa, Aichi-ken (JP); Shoichi Ieoka, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 1 day.

(21) Appl. No.: 10/165,456

(22) Filed: Jun. 7, 2002

(65) Prior Publication Data

US 2003/0011340 A1 Jan. 16, 2003

(30) Foreign Application Priority Data

Jun. 8, 2001 (JP) .......................... 2001-174499

(51) Int. Cl.$^7$ ................................. H02P 1/46
(52) U.S. Cl. ...................... 318/700; 318/618; 318/254; 318/138; 318/439
(58) Field of Search ................. 318/618, 700, 318/254, 138, 439, 603, 599, 799

(56) References Cited

U.S. PATENT DOCUMENTS

| | | | |
|---|---|---|---|
| 4,061,960 A | * 12/1977 | Lloyd | 324/238 |
| 4,814,677 A | 3/1989 | Plunkett | 318/254 |
| 5,019,756 A | 5/1991 | Schwarz | 318/254 |
| 5,463,299 A | * 10/1995 | Futami et al. | 318/618 |
| 6,160,367 A | 12/2000 | Higashi et al. | 318/254 |
| 6,591,173 B2 | * 7/2003 | Nada | 701/29 |

FOREIGN PATENT DOCUMENTS

| | | | |
|---|---|---|---|
| DE | 199 53 265 A1 | 5/2001 | H02P/1/18 |
| EP | 1 213 828 A | 6/2002 | H02P/6/18 |
| JP | 2000-050677 | 2/2000 | H02P/6/18 |

OTHER PUBLICATIONS

Takeshita, et al. "Back EMF Estimation–Based Sensorless Salient–Pole Brushless DC Motor Drives" T.IEE Japan, vol. 117–D, No. 1, '97 p. 98–p. 104.
Takeshita, et al. "Initial Rotor Position Estimation of Sensorless Salient–Pole Brushless DC Motor" T.IEE Japan Vol 116–D, No 7 '96 p. 736–p742.

* cited by examiner

Primary Examiner—Karen Masih
(74) Attorney, Agent, or Firm—Morgan & Finnegan, LLP (57) ABSTRACT

A speed control unit computes a instructed current based on an error between a instructed speed and an estimated speed. A current control unit outputs a reference voltage corresponding to an error between the instructed current and a detected motor current. By adding estimated speed electromotive force to the reference voltage, a motor-applied voltage is generated and a synchronous motor is driven. An estimation unit computes the estimated position, estimated speed, and estimated speed electromotive force of the synchronous motor. By supplying a motor current of a predetermined pattern when the synchronous motor begins to be driven, the rotor of the synchronous motor is set in a default position. The default position is used as an initial value of an estimated position.

8 Claims, 6 Drawing Sheets

MOTOR APPARATUS AND CONTROL METHOD THEREFOR

BACKGROUND OF THE INVENTION

1. Field of the Invention

The present invention relates to a motor apparatus without a position sensor or a speed sensor, and a control method therefor.

2. Description of the Related Art

Conventionally, a motor whose operations are controlled at a given position instruction (phase angle instruction) and speed instruction (rotation speed instruction) has been well known. This type of motor is normally provided with a sensor for detecting the position or speed of a rotor, and a feedback system is configured to have output of the sensor follow an instructed value.

However, if the above mentioned sensor is provided, it is difficult to reduce the cost of or downsize a motor. Additionally, depending on the environment of a motor, it is difficult to provide the above mentioned sensor. Therefore, a control method of estimating the position or speed according to other parameters without providing a sensor, and realizing the feedback system based on the estimated value has been suggested and used. The control method is hereinafter referred to as a "sensorless control method". The sensorless control method is described in, for example, "Back EMF Estimation-Based Sensorless Salient-Pole Brushless DC Motor (by Takaharu Takeshita, et al. in the Institute of Electrical Engineers of Japan, Vol.117-D No.1 published in 1997, on pages 98 to 104)". In the method described in this research paper (hereinafter referred to as the "paper A"), the position and speed of a rotor are estimated based on an externally given instruction value and the detected value of an actual motor current, and feedback control is carried out using the values.

However, in the sensorless control method, a parameter relating to the operations of a motor is detected, and the position, speed, etc. of the rotor are estimated using the detected values. For example, in the method described in the "paper A", the position, etc. of a rotor is estimated based on the detected current. That is, the data for use in estimating the position, etc. has not been collected in the initial stages of operations. Thus, in the sensorless control method, a motor drive signal is often generated based on inappropriate position data in the early stages of operations. If the motor drive signal is generated based on the inappropriate position data, the efficiency of a motor is reduced.

The motor drive signal converges into an appropriate state soon or later by the feedback system although it is in an inappropriate state in the early stages of operations. However, before it converges into the appropriate state, the efficiency of the motor is low. Therefore, there has been the problem with the sensorless control method in the environment where there is a strict demand for a shortest possible time required to obtain a desired characteristic after a motor begins to be driven. Practically, there is the problem when the sensorless control method is adopted for a motor provided in a compressor of an air-conditioner of a car, for example. That is, since an air-conditioner for a car is often required to quickly condition the temperature in a car, low efficiency of a motor in the early stages of operations is not desired.

Additionally, the technology of estimating the initial position of a rotor in the sensorless control method is described in, for example, "Initial Rotor Position Estimation of Sensorless Salient-Pole Brushless DC Motor (by Takaharu Takeshita, et al. in the Institute of Electrical Engineers of Japan Vol.116-D No.7 published in 1996, on pages 736 to 742)". However, in the method described in this paper, only the initial position is estimated, and there is the possibility that a wrong result is derived.

SUMMARY OF THE INVENTION

The present invention aims at improving the efficiency in the early stages of operations of the motor apparatus under the sensorless control.

The motor apparatus according to the present invention includes: a synchronous motor having a rotor; a controller for generating a control signal based an instruction value for instructing the operation of the synchronous motor, a current supplied to the synchronous motor, and the rotor position estimated based on the current; and a drive unit for driving the synchronous motor according to the control signal. The controller supplies a predetermined current pattern when the synchronous motor begins to be driven, and then generates the control signal using the rotor position obtained due to supplying the predetermined current pattern as an initial rotor position.

In this motor apparatus, the position of a rotor of the synchronous motor (that is, the phase of the rotor) is set in the position uniquely corresponding to the predetermined current pattern if it is supplied to the synchronous motor. Therefore, if the rotor position corresponding to the predetermined current pattern is used as the initial rotor position, then the actual rotor position matches the estimated position when the motor apparatus begins to be driven. As a result, the motor operation can be performed with high efficiency immediately after it begins to be driven.

The controller can be designed to start generating the control signal using the rotor position due to the predetermined current pattern as the initial rotor position when the predetermined current pattern becomes stable at a constant level. With this configuration, the time required to set the initial rotor position can be set to the minimal value.

DESCRIPTION OF THE PREFERRED EMBODIMENTS

An embodiment of the present invention is described below by referring to the attached drawings.

Figure 1:
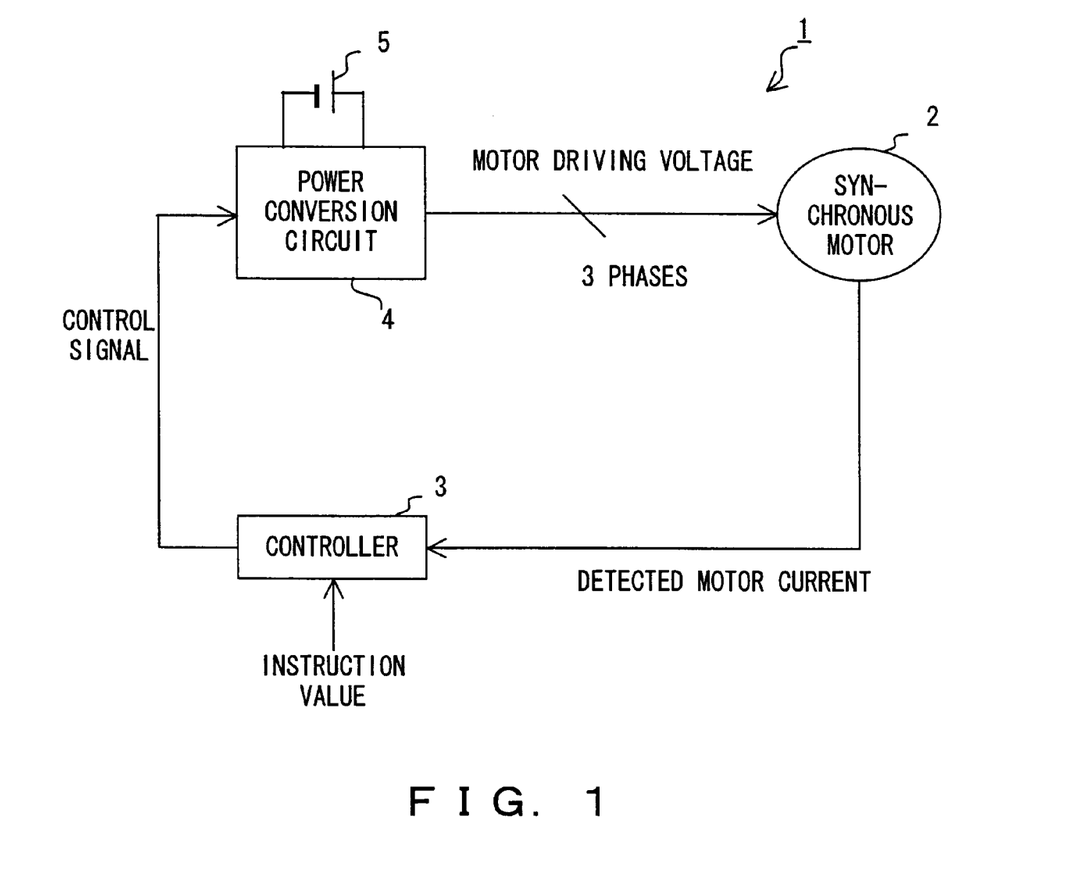
FIG. 1 shows the basic configuration of the motor apparatus according to an embodiment of the present invention.

FIG. 1 shows the basic configuration of the motor apparatus according to an embodiment of the present invention. A motor apparatus 1 according to the embodiment comprises a synchronous motor 2, a controller 3, and an power conversion circuit 4.

The synchronous motor 2 is a common 3-phase motor, and operates in synchronization with a motor driving voltage supplied by the power conversion circuit 4. The synchronous motor 2 can be either cylindrical motor or salient-pole motor.

The controller 3 generates a control signal based on an externally given instruction value and the motor current supplied to the synchronous motor 2. The given instruction value is, for example, a value indicating the speed (angular velocity) of a rotor of the synchronous motor 2. The controller 3 estimates the position (phase angle) and the speed from the above mentioned instruction value and the motor current as described later in detail, and generates a control signal using the estimated values.

The power conversion circuit 4 generates a 3-phase AC voltage (Vu, Vv, Vw) from the DC voltage supplied by DC power 5. Then, the 3-phase AC voltage is provided for the synchronous motor 2 as a motor driving voltage.

The motor apparatus 1 does not have a sensor for detecting the position or speed of the rotor of the synchronous motor 2, and it performs the sensorless control method in which the tion or speed is estimated based on other parameters.

Figure 2:
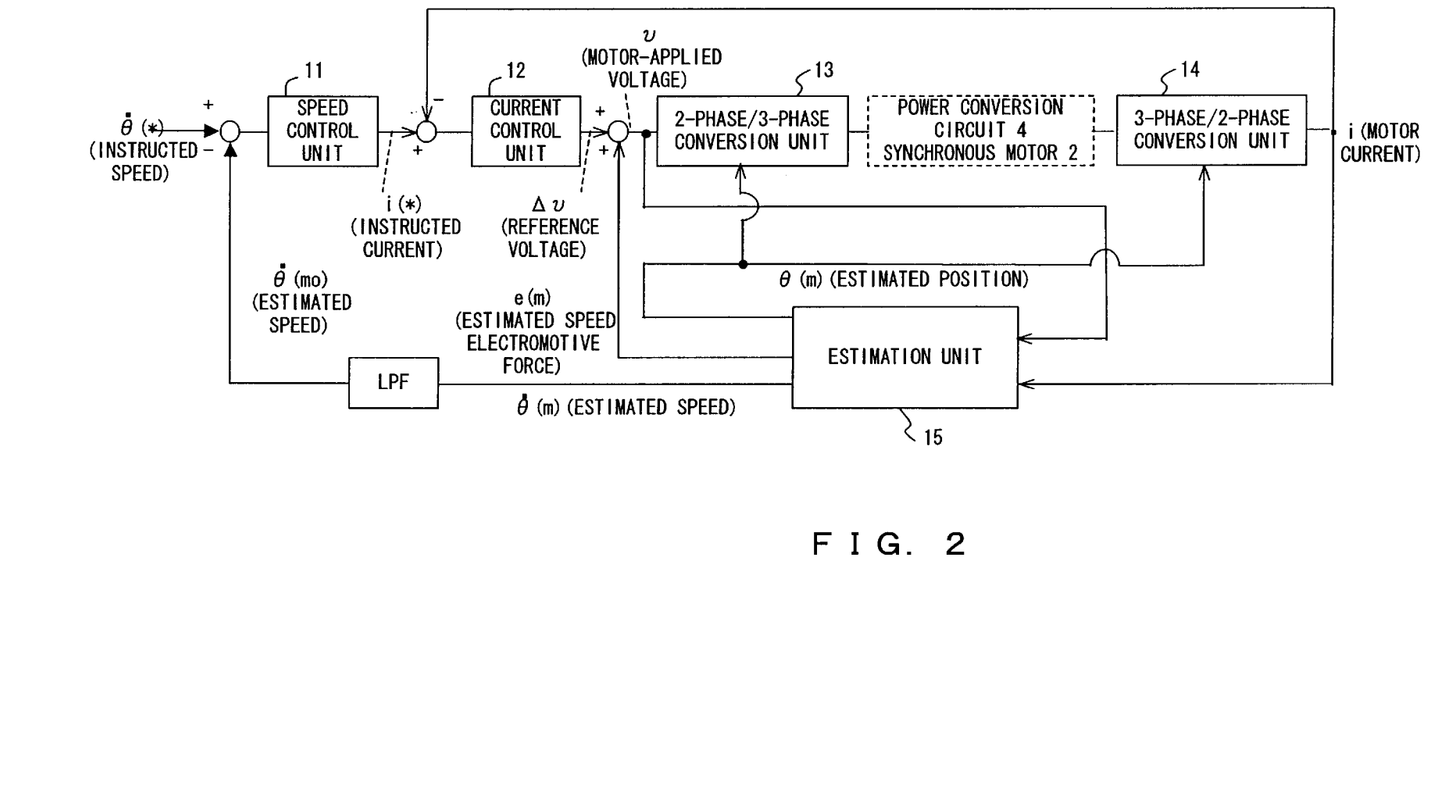
FIG. 2 is a block diagram of the motor apparatus.

FIG. 2 is a block diagram of the motor apparatus 1. The block diagram shows in detail the controller 3 shown in FIG. 1. The controller shown in this diagram is based on the control system described in the above mentioned "paper A (the Institute of Electrical Engineers, Vol.117-D No.1 published in 1997, on pages 98 to 104)".

A speed control unit 11 is, for example, a PI (proportion/integral) controller, and computes an instructed current from an error between the externally given instructed speed and the estimated speed computed by an estimation unit 15. A current control unit 12 is, for example, a PI controller, and computes a reference voltage from an error between the instructed current computed by the speed control unit 11 and the motor current detected through a current sensor, etc. Then, by adding the estimated speed electromotive force computed by the estimation unit 15 to the reference voltage, a motor-applied voltage is generated. The speed electromotive force is proportional to the speed of a rotor of the motor 2. As it is well known, the electromotive force "e" obtained when a linear conductor having a length of "L" traverses the magnetic flux density "B" at a speed "v" is expressed by the following equation.

$$e = vBL$$

A 2-phase/3-phase conversion unit 13 converts a motor-applied voltage expressed by a 2-phase coordinate system into a 3-phase coordinate system using the estimated position computed by the estimation unit 15. The 2-phase coordinate system can be, for example, a d-q coordinate system. The d-q coordinate system is a rotational coordinate system rotating at the same speed as the rotation angle speed of a composite vector of a voltage component, a current component, or a magnetic flux component generated when a 3-phase AC is applied to the synchronous motor 2. On the other hand, the 3-phase coordinate system is, for example, a U-V-W coordinate system. The U-phase, V-phase, and W-phase correspond to the respective coils to which 3-phase AC is provided. The conversion between the d-q coordinate system and the U-V-W coordinate system is well known. That is, the conversion between the 3-phase AC coordinate system (U-V-W coordinate system) and the static 2-phase AC coordinate system is expressed by the following equation (1).

$$\begin{pmatrix} V_a \\ V_b \end{pmatrix} = \sqrt{\frac{2}{3}} \begin{pmatrix} 1 & -\cos\frac{\pi}{3} & -\cos\frac{\pi}{3} \\ 0 & \sin\frac{\pi}{3} & -\sin\frac{\pi}{3} \end{pmatrix} \begin{pmatrix} V_u \\ V_v \\ V_w \end{pmatrix} \quad (1)$$

$$= \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} V_u \\ V_v \\ V_w \end{pmatrix}$$

The conversion between the static 2-phase AC coordinate system and the rotational coordinate system (d-q coordinate system) is expressed by the following equation (2) where $\omega$ indicates the angular velocity of the rotational coordinate system itself, and $\phi$ indicates the rotation phase expressed using, for example, the estimated position computed by the estimation unit 15.

$$\begin{pmatrix} V_d \\ V_q \end{pmatrix} = \begin{pmatrix} \cos(\omega t) & \sin(\omega t) \\ -\sin(\omega t) & \cos(\omega t) \end{pmatrix} \begin{pmatrix} V_a \\ V_\beta \end{pmatrix} \quad (2)$$

$$= \begin{pmatrix} \cos\phi & \sin\phi \\ -\sin\phi & \cos\phi \end{pmatrix} \begin{pmatrix} V_a \\ V_\beta \end{pmatrix}$$

The motor-applied voltage converted by the 2-phase/3-phase conversion unit 13 is supplied by the power conversion circuit 4. The power conversion circuit 4 drives the synchronous motor 2 based on the motor-applied voltage.

A 3-phase/2-phase conversion unit 14 converts the detected motor current into the corresponding current value in the 2-phase coordinate system based on the estimated position computed by the estimation unit 15. That is, the motor currents of the U-phase, V-phase, and the W-phase are converted into the current values of the d-q coordinate system. The estimation unit 15 computes the estimated speed electromotive force, the estimated position, and the estimated speed based on the motor-applied voltage and the motor current. The method of computing the estimated speed electromotive force, the estimated position, and the estimated speed is described in detail in the above mentioned "paper A".

In this feedback system, a motor-applied voltage is generated such that the estimated speed of the rotor matches the instructed speed, and the actual motor current matches the instructed current. The generated motor-applied voltage drives the synchronous motor 2. Therefore, the synchronous motor 2 operates according to an externally given instructed speed.

Figure 3:
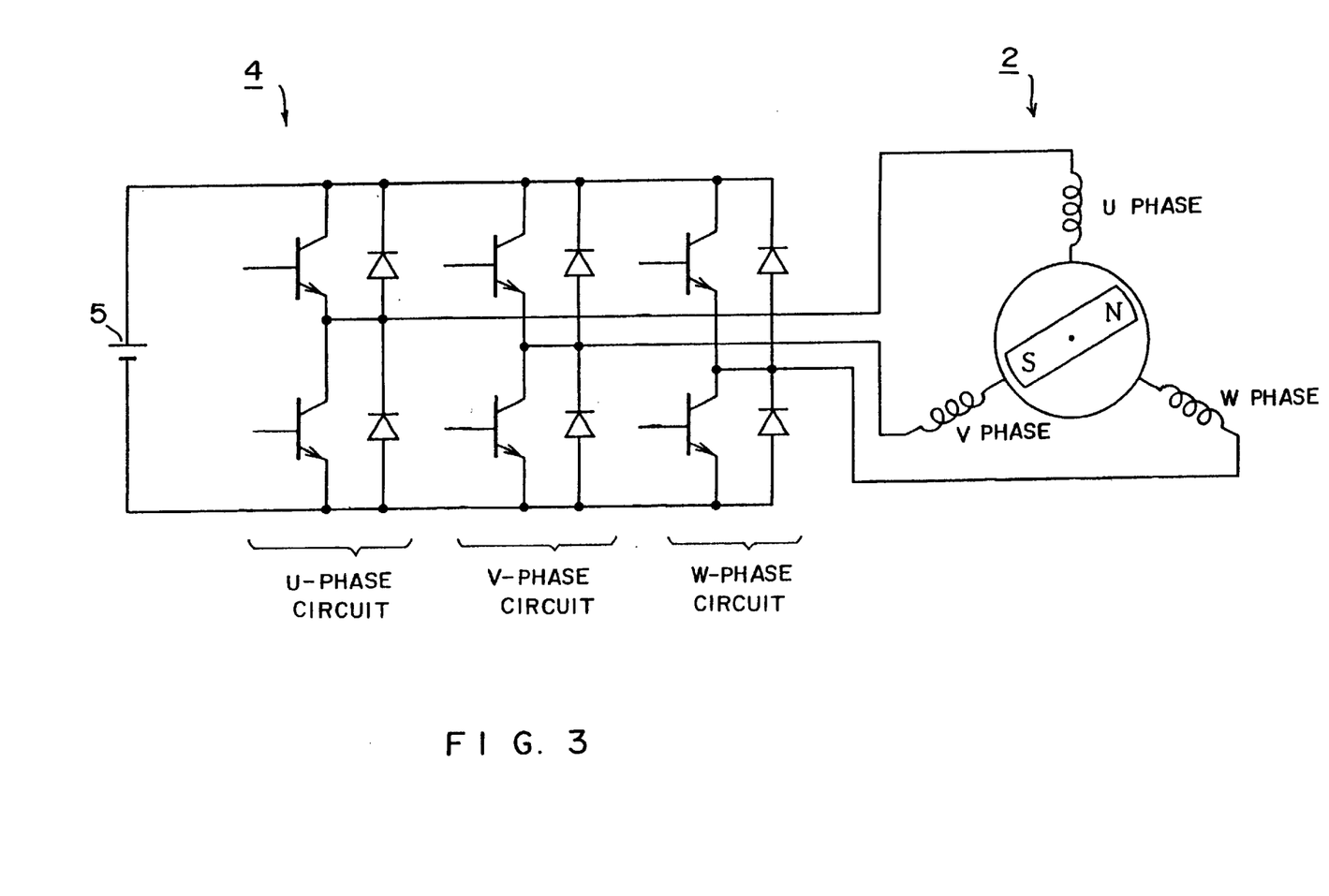
FIG. 3 shows an example of a circuit of a power conversion circuit and a synchronous motor.

FIG. 3 shows an example of the power conversion circuit 4 and a circuit of the synchronous motor 2. In the embodiment, the power conversion circuit 4 comprises a U-phase circuit, a V-phase circuit, and a W-phase circuit. The circuit of each phase comprises a set of switches serially connected to one another. The circuit of each phase is controlled by the motor-applied voltage converted by the 2-phase/3-phase conversion unit 13. Practically, assuming that each switch is controlled by the PWM (pulse width modulation) method, each switch is controlled to be turned ON/OFF according to the pulse signal having the duty cycle corresponding to the motor-applied voltage.

The synchronous motor 2 is provided with coils (U-phase coil, V-phase coil, and W-phase coil) for generating a rotating magnetic field, and a permanent magnet as a rotor. The U-phase coil, V-phase coil, and W-phase coil are respectively connected to the U-phase circuit, V-phase circuit, and W-phase circuit of the power conversion circuit 4.

FIGS. 4A through 4D show the operations of the synchronous motor 2. In this example, assume that the + side switch is controlled to be set ON and the − side switch is controlled to be set OFF in the power conversion circuit 4 in the U-phase circuit, while in the V-phase circuit and the W-phase circuit, the + side switch is controlled to be set OFF and the − side switch is controlled to be set ON.

Figure 4A:
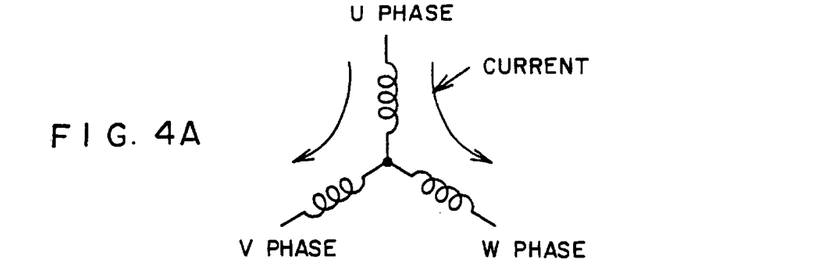
FIGS. 4A through 4D show the operations of a synchronous motor.
Figure 4B:
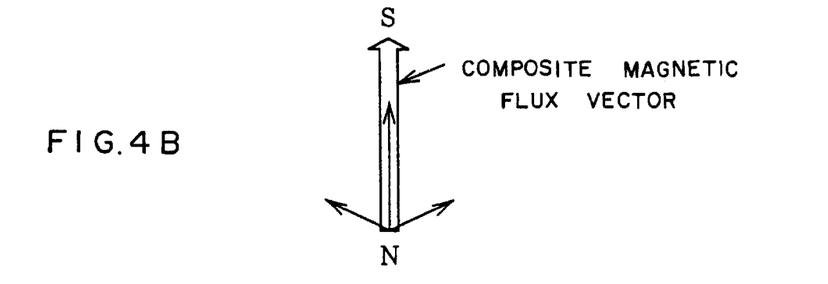
Figure 4C:
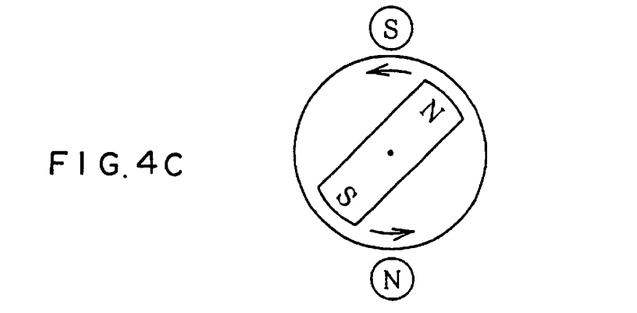
Figure 4D:
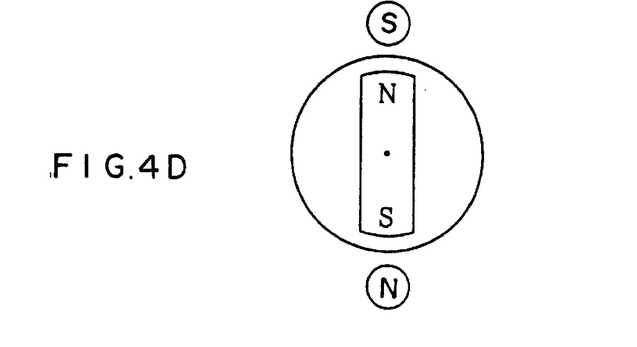

In this case, the motor current flows as shown in FIG. 4A. The motor current generates the magnetic flux in each coil. The composite vector of the magnetic flux is obtained as shown in FIG. 4B. Therefore, assuming that the rotor is positioned as shown in FIG. 4C, the rotor rotates counterclockwise by passing the current through the coil as described above.

Similarly, if the rotating magnetic field is generated by appropriately controlling each switch of the power conversion circuit 4, the rotor rotates synchronously.

The motor apparatus 1 according to the present embodiment is based on this configuration, and forcibly sets the rotor of the synchronous motor 2 in a predetermined position in the initial stage of operation. Practically, the motor current of a predetermined pattern is supplied to the synchronous motor 2 fixedly in a predetermined time period. In this example, the motor current shown in FIG. 4A is provided. Since the magnetic flux shown in FIG. 4B is generated in this case, the rotor is set in the position shown in FIG. 4D (hereinafter referred to as a "default position"). That is, the rotor of the synchronous motor 2 is forcibly set in the default position when the motor apparatus 1 begins to be driven.

Afterwards, the control system of the motor apparatus 1 starts generating a motor-applied voltage based on the default position as an initial rotor position. The subsequent operations are described in the "paper A".

The operations performed when the motor begins to be driven can be realized as follows. In the explanation below, the phase of the default position is defined as zero.

(A) The current control unit 12 outputs "zero" when the motor apparatus 1 is powered up.

(B) when the motor apparatus 1 is powered up, the estimation unit 15 outputs data for the flow of the motor current shown in FIG. 4A as the estimated speed electromotive force through the synchronous motor 2, and outputs "zero" indicating the default position as an estimated position. For example, assuming that the above mentioned equations (1) and (2) are performed by the 2-phase/3-phase conversion unit 13, the estimation unit 15 outputs "Vd" and "Vq" obtained by substituting "1", "0", "0", and "0" for "Vu", "Vv", "Vw", and "θ" respectively in the equations (1) and (2) above. In this case, the "Vu", "Vv", and "Vw" output from the 2-phase/3-phase conversion unit 13 are "1", "0", and "0" respectively, the + side switch of the U-phase circuit of the power conversion circuit 4 is controlled to be set ON, and simultaneously the + side switches of the U-phase circuit and the W-phase circuit are controlled to be set OFF, thereby passing the motor current as shown in FIG. 4A. As a result, the synchronous motor 2 is set in the state shown in FIG. 4D.

(C) After the processes in (A) and (B) above, the speed control unit 11, the current control unit 12, and the estimation unit 15 perform normal feedback operations (for example, the operations described in the above mentioned "paper A"). At this time, the initial value of the estimated position is set to "zero" indicating the phase of the default position. In addition, the rotor of the synchronous motor 2 is forcibly set in the default position. That is, when the feedback operation is started, the actual rotor position matches the estimated position.

In the processes (A) and (B) above, the rotor of the synchronous motor 2 is set in the default position using the feedback system of the motor apparatus 1. However, another circuit not shown in the attached drawings can directly control the state of the power conversion circuit 4. For example, for a predetermined time immediately after the motor apparatus 1 is powered up, another circuit not shown in the attached drawings generates a control signal for controlling such that the + side switch of the U-phase circuit is controlled to be set ON, and the + switches of the V-phase circuit and the W-phase circuit are controlled to be set OFF. In this case, after the predetermined time period elapses, "zero" indicating the phase of the default position as the initial value of the estimated position is set, and the feedback operation is started.

Figure 5:
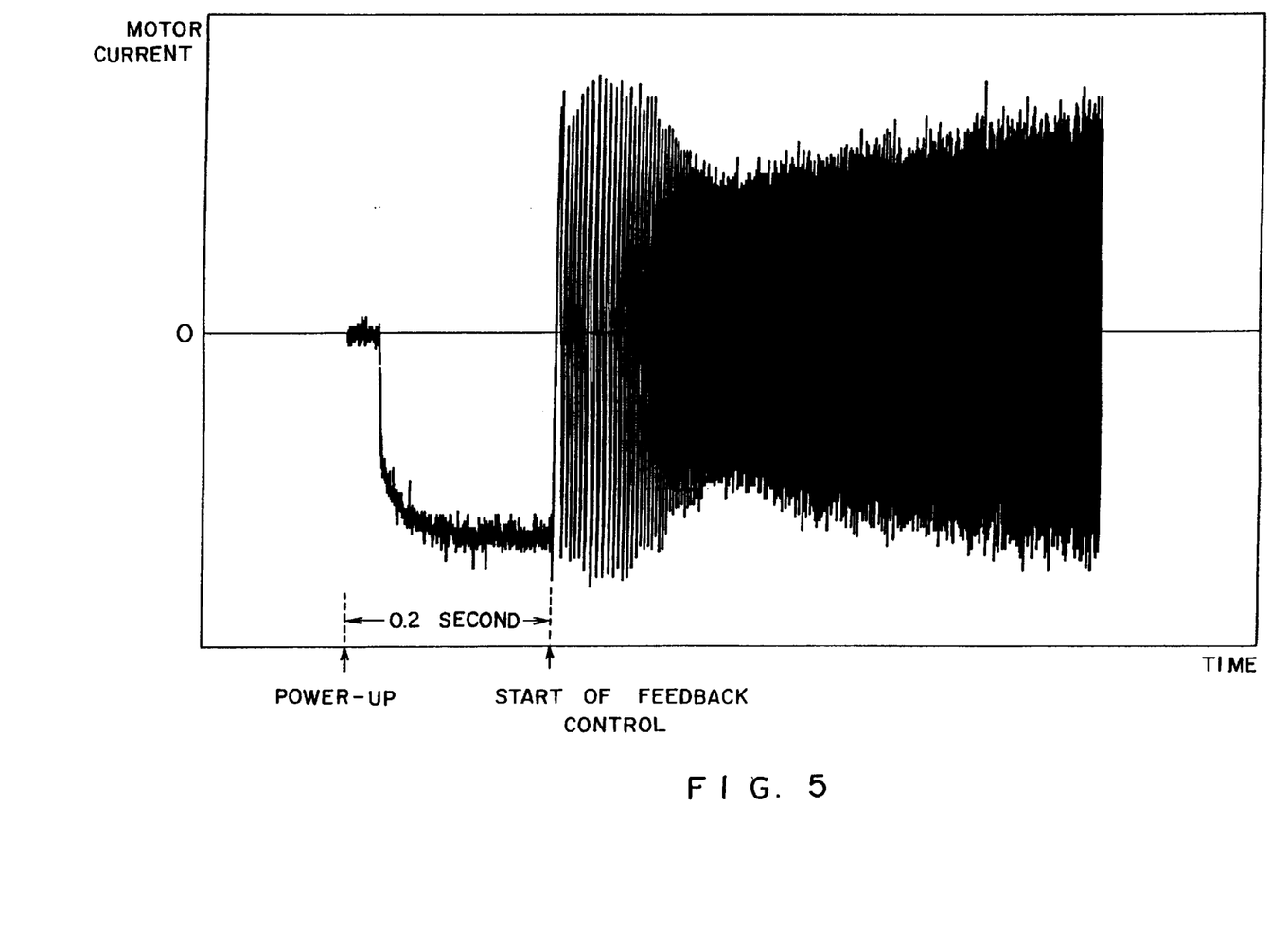
FIG. 5 shows the operations of a motor apparatus when it begins to be driven.

FIG. 5 shows the operation of the motor apparatus 1 when it begins to be driven. In FIG. 5, the current supplied to the U-phase coil of the synchronous motor 2 is shown.

When the motor apparatus 1 is powered up, the current to be supplied to the U-phase coil is set to a default value. The default value is large enough to drive the rotor of the synchronous motor 2. When the motor current flows as shown in FIG. 4A, and the rotor of the synchronous motor 2 is set in the default position shown in FIG. 4D, the motor current becomes stable. In the embodiment, the motor current becomes stable about 0.1 second after the power-up.

When the motor current becomes stable at the default value, the rotor of the synchronous motor 2 is assumed to be set in the default position, and the feedback operation starts to set the speed of the rotor of the synchronous motor 2 at the instructed speed. In this embodiment, the feedback controlling operation starts 0.2 second after the power-up.

In the example shown in FIG. 5, the default current starts flowing when the motor is powered up, and the normal feedback control is started a predetermined time (that is, 0.2 second) after the power-up. However, normal feedback control can be activated when the motor current becomes stable. The motor current becomes stable when the rotor moves into the position corresponding to the motor current. That is, the state in which the motor current is stable at a predetermined value refers to the position of the rotor corresponding to the motor current. Therefore, if normal feedback control is activated when the motor current becomes stable, then the actual position of the rotor of the synchronous motor 2 can match the initial value of the estimated value. In this method, the feedback controlling operation can be started before 0.2 second has passed after the power-up.

Figure 6A:
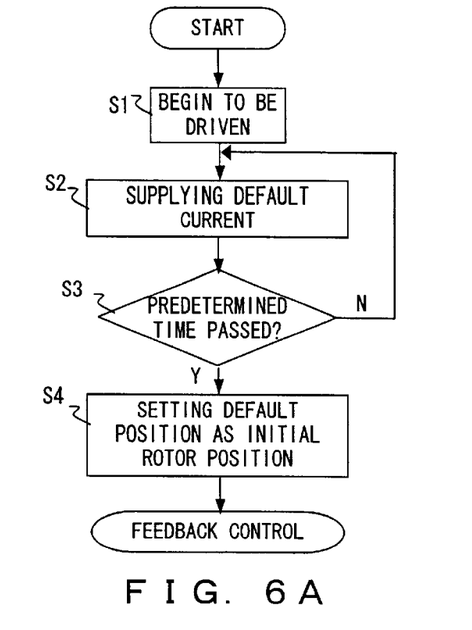
FIGS. 6A and 6B are flowcharts of the operations of the motor apparatus when it begins to be driven according to the embodiment of the present invention.
Figure 6B:
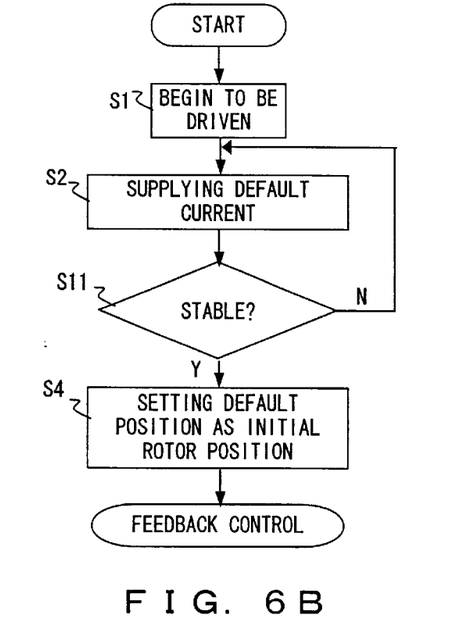

FIGS. 6A and 6B are flowcharts of the operation of the motor apparatus 1 when it begins to be driven according to the present embodiment. In step S1, the motor apparatus 1 is activated through the power-up. In step S2, a default current is supplied to the synchronous motor 2. The default current is, for example, the motor current shown in FIG. 4A.

Then, in step S3 shown in FIG. 6A, it is checked whether or not a predetermined time has passed after the power-up. The supply of the default current continues until the predetermined time has passed. When the predetermined time passes, control is moved to step S4. Here, the step S4 shown in FIG. 6B (Is it stable?) can be performed in the place of step S3.

In step S4, the default position is set as an initial rotor position of the estimated position of the rotor of the synchronous motor 2. Then, the feedback control is carried out.

Thus, in the motor apparatus 1 according to the present embodiment, the rotor position is forcibly set in a predetermined default position in the initial stages of operation, and the default position is used as the initial rotor position of the estimated position. Thus, in the motor apparatus 1, the actual rotor position of the synchronous motor 2 matches the estimated position from the very early stage of the operation. Therefore, the motor apparatus 1 has high motor efficiency immediately after the it begins to be driven.

The motor apparatus 1 according to the present embodiment is effective in an environment in which there is a strict demand for the period from the start of drive to the time when a desired characteristic is obtained. For example, if the motor apparatus 1 is used as a motor provided with a compressor of a car air-conditioner, it is expected that the temperature can be conditioned within the shorter time.

Additionally, according to the above mentioned embodiment, the motor apparatus 1 uses the estimating method described in the "paper A", but the estimating method is not specifically limited, but can be any other effective methods.

According to the present invention, since the actual motor position matches the estimated position immediately after the motor apparatus begins to be driven, the motor efficiency is enhanced immediately after it is started.

What is claimed is:

1. A motor apparatus, comprising:
   a synchronous motor having a rotor;
   a controller generating a control signal using a instruction value for indicating an operation of said synchronous motor, a current supplied to said synchronous motor, and a rotor position estimated based on the current; and
   a drive unit driving said synchronous motor according to the control signal, wherein
      said controller supplies a predetermined current pattern to said synchronous motor through said drive unit when said synchronous motor begins to be driven, and generates the control signal using a rotor position obtained due to supplying the predetermined current pattern as an initial rotor position.

2. The motor apparatus according to claim 1, wherein said controller starts generating the control signal using a rotor position obtained due to supplying the predetermined current pattern as an initial rotor position after the predetermined current pattern is supplied for a predetermined time period.

3. The motor apparatus according to claim 1, wherein said controller starts generating the control signal using a rotor position obtained due to supplying the predetermined current pattern as an initial rotor position when the predetermined current pattern becomes stable at a constant value.

4. The motor apparatus according to claim 1, wherein the instruction value is a rotation speed.

5. The motor apparatus according to claim 1, wherein said controller performs a feedback operation after supplying the predetermined current pattern.

6. A control method of controlling a motor apparatus having a synchronous motor with a rotor, a controller generating a control signal using a instruction value for indicating an operation of the synchronous motor, a current supplied to the synchronous motor, and a rotor position estimated based on the current, and a drive unit driving the synchronous motor according to the control signal, comprising:
   supplying a predetermined current pattern to the synchronous motor through said drive unit when the synchronous motor begins to be driven; and
   generating the control signal using a rotor position obtained due to supplying the predetermined current pattern as an initial rotor position.

7. The control method according to claim 6, wherein the instruction value is a rotation speed.

8. The control method according to claim 6, wherein said controller performs a feedback operation after supplying the predetermined current pattern.

* * * * *

UNITED STATES PATENT AND TRADEMARK OFFICE
CERTIFICATE OF CORRECTION

PATENT NO. : 6,670,784 B2
DATED : December 30, 2003
INVENTOR(S) : Odachi et al.

It is certified that error appears in the above-identified patent and that said Letters Patent is hereby corrected as shown below:

<u>Column 6,</u>
Line 59, please delete "Here, the step S4 shown" and insert therefore -- Here, the step S11 shown --;

Signed and Sealed this

Eleventh Day of May, 2004

JON W. DUDAS
*Acting Director of the United States Patent and Trademark Office*